United States Patent [19]

Kunze et al.

[11] Patent Number: 4,892,443

[45] Date of Patent: Jan. 9, 1990

[54] CABLE PLOW

[75] Inventors: Dieter Kunze, Neuried; Peter Lancier, Wolbeck, both of Fed. Rep. of Germany

[73] Assignee: Siemens Aktiengesellschaft, Berlin and Munich, Fed. Rep. of Germany

[21] Appl. No.: 214,535

[22] Filed: Jul. 1, 1988

[30] Foreign Application Priority Data

Jul. 4, 1987 [DE] Fed. Rep. of Germany ... 8709260[U]

[51] Int. Cl.⁴ .............................................. F16L 1/04
[52] U.S. Cl. .................................... 405/164; 405/174; 405/181
[58] Field of Search ............... 405/181, 160, 161, 162, 405/163, 174; 172/260.5

[56] References Cited

U.S. PATENT DOCUMENTS

| 2,501,062 | 3/1950 | Le Tourneau | 405/181 |
|---|---|---|---|
| 3,170,301 | 2/1965 | Kelley | 405/181 |
| 3,515,222 | 6/1970 | Kant | 405/181 X |
| 3,539,018 | 11/1970 | Sprenkel | 172/260.5 X |
| 3,990,377 | 11/1976 | Marquinez | 405/161 X |
| 4,012,918 | 3/1977 | Suzuki et al. | 405/160 |
| 4,038,828 | 8/1977 | Schuck et al. | |
| 4,244,123 | 1/1981 | Lazure et al. | 405/181 X |
| 4,314,414 | 2/1982 | Reynolds et al. | 405/161 X |

FOREIGN PATENT DOCUMENTS

| 2701474 | 7/1977 | Fed. Rep. of Germany . |
| 2705289 | 8/1978 | Fed. Rep. of Germany . |
| 3245625 | 9/1983 | Fed. Rep. of Germany . |
| 3228040 | 9/1985 | Fed. Rep. of Germany . |

Primary Examiner—Dennis L. Taylor
Attorney, Agent, or Firm—Hill, Van Santen, Steadman & Simpson

[57] ABSTRACT

A cable plow having a chassis with a pivot arm having a first end pivotably connected to the chassis and a second end pivotably connected to a plow element characterized by an arrangement extending between the plow element and the pivot arm to resist pivoting of the plow element from a desired or rated plowing position in response to increased forces applied on the element. Preferably, the chassis is constructed as a sled which is adapted for plowing or laying cable on either land or beneath the water's surface.

6 Claims, 2 Drawing Sheets

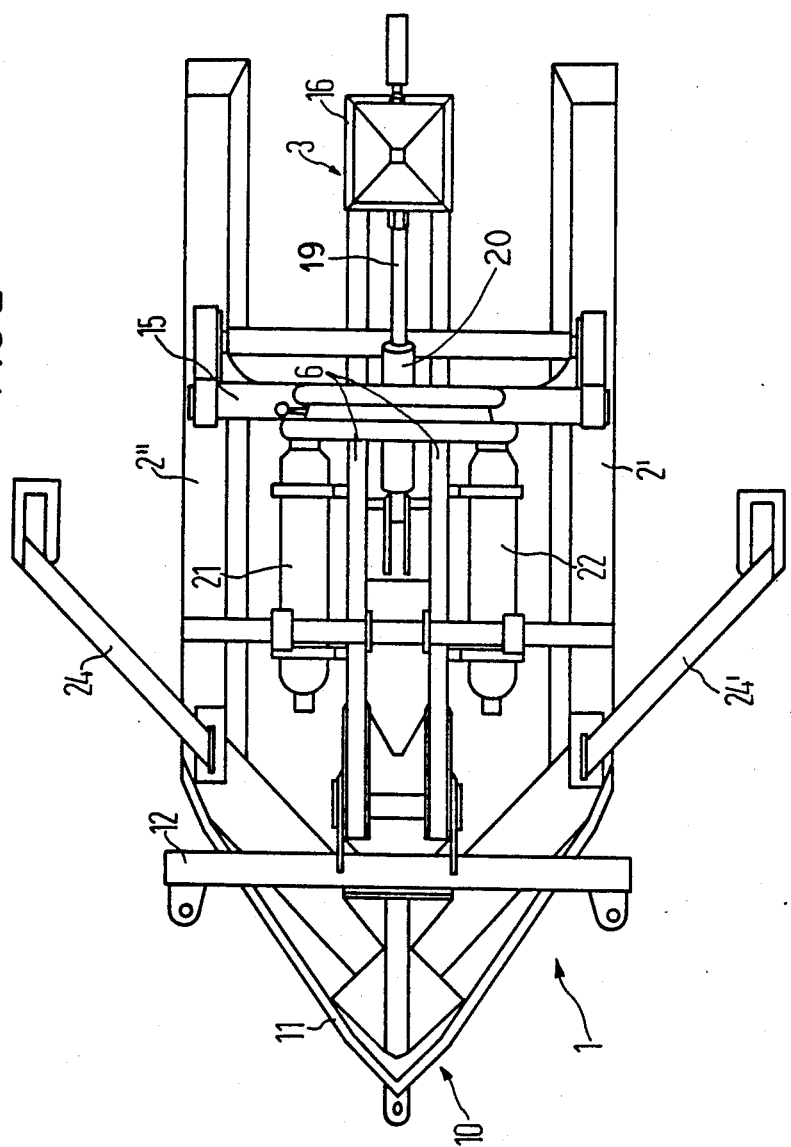

CABLE PLOW

BACKGROUND OF THE INVENTION

The present invention is directed to a cable plow comprising a chassis moving over the ground or surface to be plowed and to be provided with a cable, a plow element is pivotably mounted on an end of a swivel arm being secured to a pivot point on the chassis, said plow element being composed of a combination of displacement parts or plowshares and a laying housing, wherein the plow element together with the swivel arm is adjustable into raised positions above the desired horizontal plowing position and the plow element is also additionally pivotable around the pivot point in a plane that lies parallel to the plowing direction.

Cable plows, that the assignee of the present application manufactures and distributes in numerous modifications, are suitable for laying lighter cables, given narrow and tight laying lines. For example, the laying depth amounts to approximately 80 cm. The cable to be laid and plowed under is continuously supplied and laid by the laying housing arranged to follow the plowshare. A cable drum can be attached to the chassis of the plow but, as needed, can also be attached to the tractor vehicle pulling the plow.

Such cable plows are generally used on land. It would be desirable to be able to provide a cable plow that also will handle larger cable diameters and that can, in particular, be utilized over different terrains, which may include shallow water and underwater utilization. In such areas of utilization, the ground is, in part, very easy to penetrate, since it is composed of mud and silt. However, coral or rock formations can also appear that will provide considerable resistance to the plowshare. It is not necessary that the depth of 80 cm be observed in this case. Shorter or smaller penetration depths are adequate.

SUMMARY OF THE INVENTION

The object of the present invention is to provide a design for a cable plow which automatically sets suitable laying depths for different terrains or ground surfaces which may alternately include extremely soft and extremely hard formations so that the tractive force of the plow simultaneously varies automatically in accordance with the ground condition.

This object is achieved in an improvement in a cable plow composed of a chassis for moving over a surface to be plowed and to be provided with a cable, a swivel arm having one end pivotally connected to the chassis, a plow element being pivoted to another end of the swivel arm and being composed of a combination of plowshares and a laying housing, the plow element together with the swivel arm being adjustable out of the desired plowing position into a raised position and the plowing element is also, additionally, pivotable around a pivot point of the other end of the swivel arm in a plane that extends parallel to the plowing direction. The improvements are means for opposing the pivoting of the plow element around the pivot point by applying opposing torque to force the plow element back to the desired or solid plowing position.

This opposing torque can be constant. However, it can also be metered, dependent on the rotational angle, so that conditions of the appertaining ground formation must be taken into consideration. Given a corresponding hardening of the ground, the plow element pivots out of the desired plowing position and, at the same time, penetrates into the ground to a lesser depth since the setting angle of the blade of the plowshare turns relative to the plowing direction and lifts the plow out of the plowing furrow.

It has been shown that a setting angle of the plowshare blade in the desired plowing position should, preferably, lie in the range of between 30° and 35°.

The apparatus for generating an opposing torque is preferably composed of a piston-and-cylinder arrangement that is hydraulically operated and buffered by an accumulator, preferably a compressed gas accumulator.

The chassis in the present device is, preferably, composed of a sled frame comprising two undercarriage skids.

Over and above this, the combined elements of the swivel arm with the plow element can be set in terms of weight and in terms of weight distribution so that when the plow element swivels or pivots, the entire swivel arm moves up and, thus, a defined plowing depth is set, dependent on the displacement and swivel of the plow element around the pivot point on the swivel arm and pitching or pivoting of the swivel arm itself.

An advantageous, automatic adjustment of the displacement part of the plow element thereby occurs in accordance with the respectively required plowing and penetration depth of the existing sub-soil.

Other advantages and features of the invention will be readily apparent from the following description of the preferred embodiments, the claims and drawings.

BRIEF DESCRIPTION OF THE DRAWINGS

FIG. 2 is a plan view of the cable plow of FIG. 1.

DESCRIPTION OF THE PREFERRED EMBODIMENTS

Figure 1:
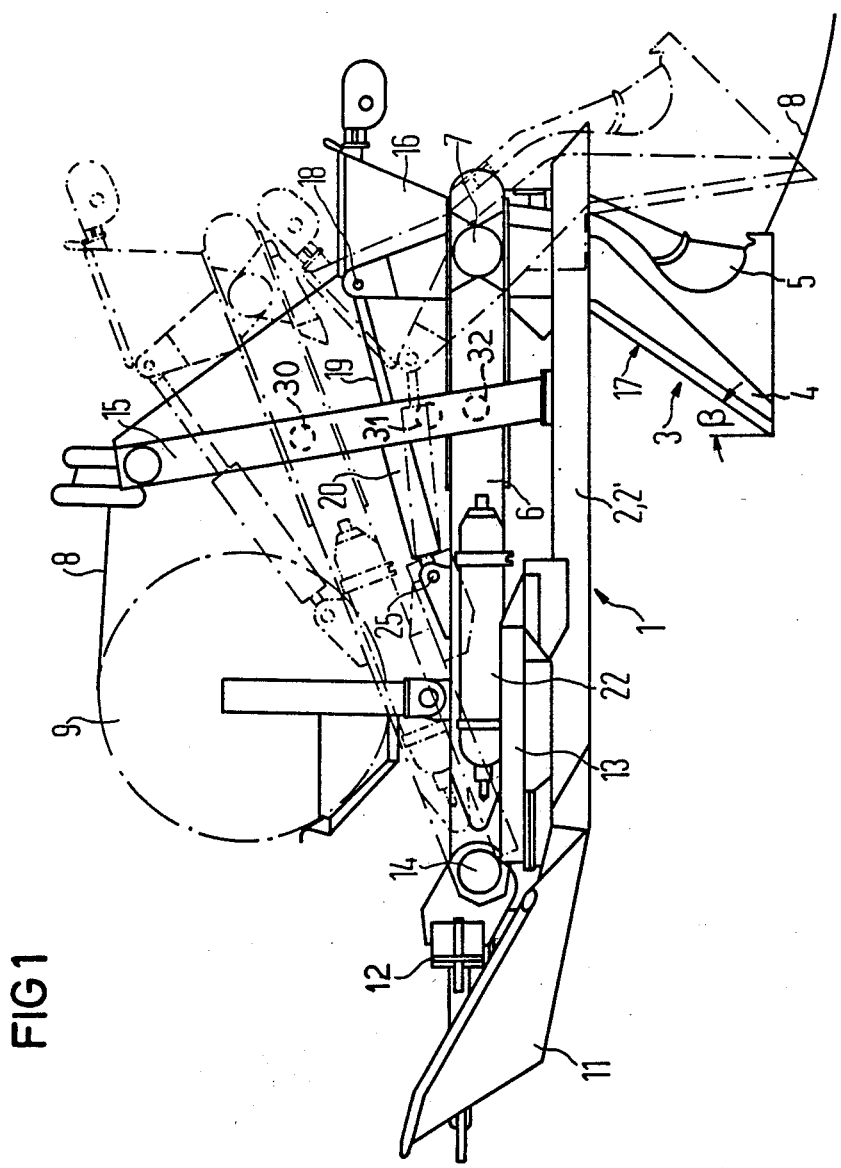
FIG. 1 is a side view of a cable plow in accordance with the present invention.

The principles of the present invention are particularly useful when incorporated into a cable plow, generally indicated at 1 in FIGS. 1 and 2. As illustrated, the pivotably movable parts are shown in heavy lines in the desired or rated plowing position. The possible deflected or pivoted positions are illustrated in chain lines.

The cable plow 1 is particularly intended for underwater operations in shallow water regions. A cable 8, that is situated on a cable drum 9, is conducted through a funnel 16 to a laying housing 5 and is introduced into a plow trench following the laying housing.

In the present case, the cable plow 1 is constructed of a sled-like chassis 2 that is composed of two skids 2' and 2" (see FIG. 2) that run parallel to each other and extend to a bow 10 at the front end of the chassis. The bow 10 merges into a bow cladding 11 (best illustrated in FIG. 1). A drawbar 12 is secured to the bow cladding 11, as best illustrated in FIG. 2, and a pair of extensible supports 24 and 24' can be provided to extend outwardly from the skids 2' and 2".

As best illustrated in FIG. 1, a bench or frame 13 is constructed on the chassis 2 and carries a hinge 14. A swivel arm 6 is connected to the hinge 14 and the swivel arm 6, which is formed by the parallel extending elements, lies above the skids 2' and 2" and occupies, basically, a roughly middle position between the two skids (as best illustrated in FIG. 2).

In a normal position, which is illustrated in FIG. 1 in bold lines, the swivel arm 6 lies in a substantially horizontal plane. It can assume different raised positions, at which it can likewise be fixed. A gate-like holding mechanism 15 extends above the skids 2' and 2" forming the chassis and is provided for this support. The swivel arm is capable of being fixed in various positions relative to the chassis by a holding mechanism having cross-stays, which are illustrated by broken circles 30, 31 and 32.

A plow element 3 is connected to the other or second end of the swivel arm 6 by a pivot connection 7. The plow element 3 is composed of a combination of displaceable parts or plowshares 4, as well as the laying housing 5, which is firmly connected to be immediately behind the plowshares 4. An upper part of the plow element 3 forms the admission funnel 16, which accepts the cable 8 and introduces it into the input of the laying housing 5.

As may be seen from FIG. 1, the plow element 3, which is pivotally connected at a pivot point 7 to the swivel arm 6, has a swivel or pivot plane, that extends parallel to the plowing direction. The axis, on which the element 3 pivots, extends perpendicular to this plane, which is also the plane of the drawing, and, roughly, transverse to the arm 6.

In the desired plowing position, a setting angle $\beta$ is formed by the plowshare blade portion 17 relative to a perpendicular line. This angle $\beta$ lies in the range of between 30° and 35°.

The plow element 3 also has a hinge arm or a lever arm 18, which is positioned in front of the admissions funnel 16, and this lever arm 18 is rigidly connected to the plowshares and laying housing. The end of the lever arm 18 is provided with an attachment for a piston rod 19 that extends into a cylinder 20 and forms a piston-cylinder system together therewith. The cylinder 20 of the piston-cylinder systems 19, 20 is, in turn, connected to the swivel arm 6 in an articulate fashion at a swivel point 25. As may be seen, two compressed gas accumulators 21 and 22 are connected on both sides of the arm 6 and, thus, on both sides of the piston-cylinder arrangement 19, 20. These compressed gas accumulators 21 and 22 will pivot together with the swivel arm 6 and are connected to the cylinder 20 via lines which are not shown. When the rod 19 presses into the piston 20, then the compressed gas in the accumulators 21 and 22, which are referred to as membrane accumulators, act both as resilient counter-pressure generators, as well as shock absorbers. Normally, the piston-cylinder system 19, 20 is charged by the compressed gas accumulators 21 and 22 so that the plow element 3 is set into its outermost position that is referred to as the rated or desired plowing position, which is shown in solid lines in FIG. 1.

In accordance with the structure set forth above, however, the plow element 3 can swivel around the pivot point 7 to a position illustrated in chain lines, and is displaced out of the rated or desired plowing position. This pivoting is opposed by the piston-cylinder 19, 20, as well as by the accumulators 21 and 22, which apply an opposing torque which will force the plow element 3 back into the rated or desired plowing position.

Upon employment of the above-described cable plow 1 with a standard penetration depth of the cable plow in its rated or desired plowing position, for example, which depth lies in a range of between 50 and 100 cm, the plowshare 4 intercepts the usual opposing forces with the assistance of the above-described apparatus. When, by contrast, the force acting on the plow element becomes greater, then the plow element 3 will swivel up in a counter-clockwise direction, as illustrated in FIG. 1, whereby it simultaneously occurs that the plow element penetrates to a lesser depth under the level of the ground or surface. The swivel or pivot arm 6 can also be swivelled around the hinge portion 14 by this force. However, it is also possible to arrange the swivel arm to be in a different position, which is inclined to the parallel horizontal position, shown in bold lines, from the very outset in order to limit the plow position. The setting of the automatic adjustment of the plowing depth also, obviously, is involved with the setting angle $\beta$ that has been empirically calculated and that allows the adjustment of the plow depth, dependent on the nature of the ground in the desired way.

The strength of the opposing torque will predominately depend on the size of the plow element and on the desired plowing depth that is, in turn, a function of the design of the plow element, of the furrow width and similar parameters that, however, are at the command of a person skilled in the art.

The cable plow 1 is used by being lowered onto the surface, which may be either dry ground or a base of the body of water and is pulled to cause plowing. If the plowing is to be of a base surface or bottom of a large body of water, such as a lake, then the plow can be pulled by a powerful tugboat. Tests have shown that faultless plowing results can be achieved with the assistance of the plow.

Although various minor modifications may be suggested by those versed in the art, it should be understood that we wish to embody within the scope of the patent granted hereon all such modifications as reasonably and properly come within the scope of our contribution to the art.

We claim:

1. In a cable plow composed of a chassis which moves over a surface which is to be plowed and provided with a cable, a swivel arm pivotably connected to the chassis at one end by a first pivot connection, a plow element being pivotably connected by a second pivot connector to the other end of the swivel arm for pivoting around a second pivot point in a plane that lies parallel to the plowing direction and at right angles to a horizontal plane, said plow element being composed of a combination of plowshares and including a laying housing, and said plow element together with the swivel arm being adjustable out of a rated plowing position into a raised position, the improvements comprising said chassis having a sled frame having two sliding, parallel extending skids and a bow connecting said skids together, and said plow includes means for applying an opposing torque to force the plow element back to the rated position when pivoted around the second pivot point by striking an obstruction during plowing.

2. In a cable plow according to claim 1, wherein the plowshares have blades, said blades forming a setting angle with a line extending perpendicular to the horizontal when the plow element is in the rated position, said setting angle being in a range between 30° and 35°.

3. In a cable plow according to claim 1, wherein the means for creating an opposing torque comprises a hydraulic piston-cylinder arrangement connected between the swivel arm and a lever rigidly connected to the plow element, said piston-cylinder arrangement being buffered with pressure from at least one pressure accumulator.

4. In a cable plow according to claim 1, wherein the chassis has means for fixing the swivel arm in at least one position above the horizontal position.

5. A cable plow for laying cable beneath a surface, said surface including bottom surfaces of bodies of water, said plow comprising a chassis having a sled frame having two parallel extending, sliding skids interconnected at a front end by a bow, a swivel arm pivotably connected to the chassis at said front end thereof by a first pivot connection, a plow element being pivotably connected to the other end of the swivel arm at a pivot point for pivoting in a plane extending substantially perpendicular to the surface and parallel to the plowing direction, means for pivoting the swivel arm around the first pivot connection to change the depth of penetration of the plow element, said plow element being composed of a combination of plowshares and including a laying housing, and means for applying an opposing torque to force the plow element back to a rated position when pivoting around a pivot point by the plow element hitting an obstruction beneath the surface, said means for applying including a lever arm rigidly attached to the plow element, a hydraulic piston-cylinder arrangement being connected between the swivel arm and said lever, said piston-cylinder arrangement being buffered with a pressure from at least one pressure accumulator to urge the plow element into the rated position.

6. A cable plow according to claim 5, wherein the plowshares have blades, said blades forming a setting angle with a line extending perpendicular to the horizontal when the plow element is in the rated position, said setting angle being in a range of between 30° and 35°.

* * * * *